(12) United States Patent
Mizutani

(10) Patent No.: US 7,919,168 B2
(45) Date of Patent: Apr. 5, 2011

(54) PLUGGED HONEYCOMB STRUCTURE

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/501,144

(22) Filed: Jul. 10, 2009

(65) Prior Publication Data

US 2009/0280292 A1    Nov. 12, 2009

Related U.S. Application Data

(63) Continuation of application No. PCT/JP2008/050146, filed on Jan. 9, 2008.

(30) Foreign Application Priority Data

Mar. 28, 2007 (JP) .................. 2007-084978

(51) Int. Cl.
*B32B 3/12* (2006.01)
*B01D 39/06* (2006.01)

(52) U.S. Cl. ............... 428/117; 428/116; 55/523

(58) Field of Classification Search .......... None
See application file for complete search history.

(56) References Cited

U.S. PATENT DOCUMENTS

| | | | |
|---|---|---|---|
| 4,519,820 A * | 5/1985 | Oyobe et al. ............ | 55/284 |
| 2002/0076523 A1 | 6/2002 | Ketcham et al. | |
| 2004/0047774 A1 | 3/2004 | Suwabe et al. | |
| 2005/0153099 A1 * | 7/2005 | Yamada ............ | 428/117 |
| 2005/0191461 A1 | 9/2005 | Kasai et al. | |
| 2006/0029769 A1 | 2/2006 | Ichikawa et al. | |
| 2006/0068159 A1 * | 3/2006 | Komori et al. ........ | 428/116 |
| 2008/0138567 A1 | 6/2008 | Ninomiya et al. | |

FOREIGN PATENT DOCUMENTS

| | | |
|---|---|---|
| JP | A-59-28010 | 2/1984 |
| JP | A-4-301114 | 10/1992 |
| JP | A-5-5412 | 1/1993 |
| JP | A-2001-300922 | 10/2001 |
| JP | A-2002-250216 | 9/2002 |
| JP | A-2004-251266 | 9/2004 |
| JP | A-2005-270969 | 10/2005 |
| JP | A-2006-326574 | 12/2006 |
| WO | WO 2004/052502 A1 | 6/2004 |

* cited by examiner

*Primary Examiner* — Gordon R Baldwin
(74) *Attorney, Agent, or Firm* — Oliff & Berridge, PLC

(57) ABSTRACT

A plugged honeycomb structure includes: a honeycomb structure having porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face. There, 1.5% or more of the plugging portions plugging the opening portions of the predetermined cells on the inlet end face have a depressed pit on the end face on the inlet end face side.

11 Claims, 4 Drawing Sheets

FLOW OF FLUID

PLUGGED HONEYCOMB STRUCTURE

TECHNICAL FIELD

The present invention relates to a plugged honeycomb structure suitably used as a dust-collecting filter such as a diesel particulate filter.

BACKGROUND ART

A plugged honeycomb structure is widely used as a dust-collecting filter for exhaust gas, for example, as a diesel particulate filter (DPF) for trapping and removing particulate matter (particulates) such as soot contained in exhaust gas from a diesel engine or the like (see, e.g., Patent Document 1).

As shown in FIG. 7, such a plugged honeycomb structure 11 used as a dust-collecting filter is provided with a honeycomb structure 2 having porous partition walls 4 separating and forming a plurality of cells 5 communicating between an inlet end face A on an inlet side of a fluid and an outlet end face B on an outlet side of the fluid, and plugging portions 3 for plugging an opening portion of each of predetermined cells 5 on the inlet end face A and an opening portion of each of the other cells 5 on the outlet end face B. Generally, adjacent cells 5 are alternately plugged in such a manner that the inlet end face A and the outlet end face B show complementary checkerwise patterns.

In the case of using a plugged honeycomb structure 11 having such a structure as a DPF or the like, when gas $G_1$ to be treated is introduced into cells 5 from the inlet end face A, particulate matter such as soot is trapped in the partition walls 4, and treated gas $G_2$ flowing into the adjacent cells 5 by passing through the porous partition walls 4 is discharged from the outlet end face B, thereby obtaining treated gas $G_2$ where particulate matter in the gas $G_1$ to be treated is separated.

By the way, a plugged honeycomb structure which has conventionally been used as a DPF or the like has a flat end face on the inlet end face A side of each of the plugging portions 3 as shown in FIG. 8. When a plugged honeycomb structure 11 is arranged in an exhaust gas flow passage, an exhaust gas flow passage area is drastically reduced on the inlet end face A of the plugged honeycomb structure 1. Then, the fluid striking the plugging portions 3 causes a stagnation of flow on the inlet end face A as shown in FIG. 8, which affects the flow of the fluid into the opening cells between the plugging portions 3 to cause a flow stagnation of the fluid flowing into the cells 5 in the vicinity of the inlet end face A and cause a peel-away vortex. As a result, pressure loss rises in the vicinity of the inlet end face A. In addition, by the excess deposition of soot on the inlet end face A due to the flow stagnation in the vicinity of the inlet end face A, the opening portions of the cells 5 are clogged with soot in a short period of time to cause deterioration in filter performance.

Patent Document 1: JP-A-2001-300922

DISCLOSURE OF THE INVENTION

The present invention has been made in view of such circumstances and aims to provide a plugged honeycomb structure where a flow of a fluid into the cells becomes smooth on the inlet end face to be able to reduce pressure loss and suppress clogging of the cells by excess deposition of soot.

In order to achieve the above object, according to the present invention, there is provided the following plugged honeycomb structure.

[1] A plugged honeycomb structure comprising: a honeycomb structure having porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face; wherein 1.5% or more of the plugging portions plugging the opening portions of the predetermined cells on the inlet end face have a depressed pit on the end face on the inlet end face side.

[2] The plugged honeycomb structure according to [1], wherein 2.5% or more of the plugging portions plugging the opening portions of the predetermined cells on the inlet end face have a depressed pit on the end face on the inlet end face side.

[3] The plugged honeycomb structure according to [1] or [2], wherein the depressed pit has a depth of 1 to 4 mm.

[4] The plugged honeycomb structure according to any one of [1] to [3], wherein a porosity of the plugging portions is higher than that of the honeycomb structure.

[5] The plugged honeycomb structure according to [4], wherein the plugging portions have a porosity of 80% or less.

[6] The plugged honeycomb structure according to any one of [1] to [5], wherein an opening ratio is different between the inlet end face and the outlet end face.

[7] The plugged honeycomb structure according to any one of [1] to [6], wherein the plugged honeycomb structure is constituted by unitarily combining and bonding, in a direction perpendicular to an axial direction of the cells, a plurality of honeycomb segments comprising: porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face.

According to a plugged honeycomb structure of the present invention, a flow of a fluid into the cells becomes smooth on the inlet end face to be able to reduce pressure loss and suppress clogging of the cells by excess deposition of soot.

DESCRIPTION OF REFERENCE NUMERALS

1: plugged honeycomb structure, 2: honeycomb structure, 3: plugging portion, 4: partition wall, 5: cell, 5a: quadrangular cell, 5a: octagonal cell, 6: depressed pit, 11: plugged honeycomb structure, 20: can, 21: retainer ring, 22: holding member, 25: belt, A: inlet end face, B: outlet end face

BEST MODE FOR CARRYING OUT THE INVENTION

Hereinbelow, the present invention will be described on the basis of a specific embodiment. However, the present invention should not be construed by limiting to this, and various kinds of changes, modifications, and improvements may be made on the basis of knowledge of a person of ordinary skill in the art as long as they do not deviate from the scope of the present invention.

Figure 1:
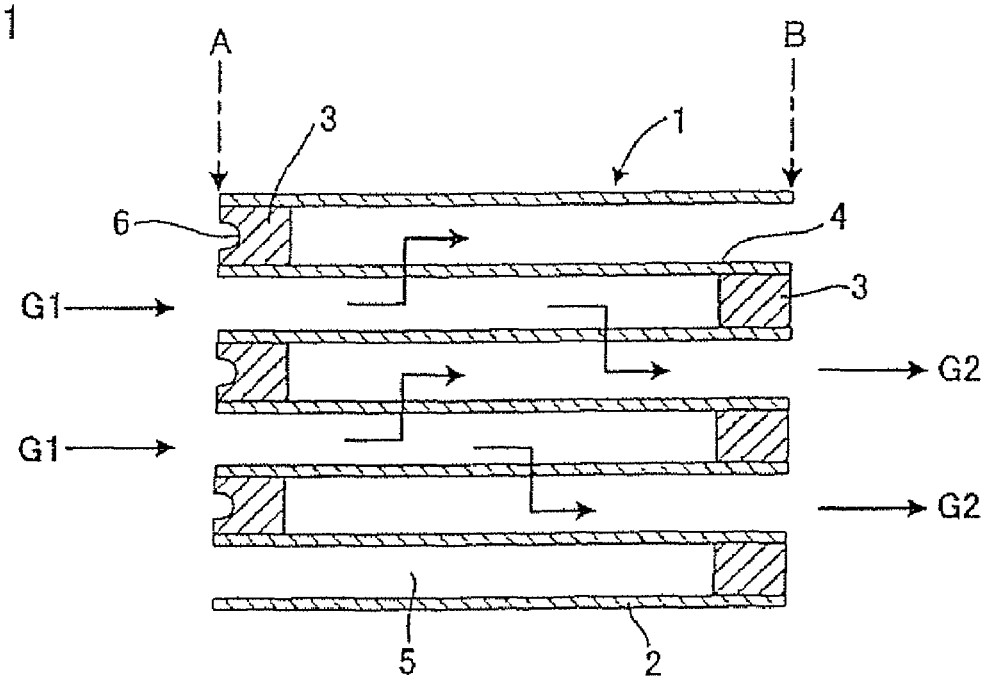
FIG. 1 is a cross-sectional view showing a constitution of a plugged honeycomb structure of the present invention.

As shown in FIG. 1, a plugged honeycomb structure 1 of the present invention is provided with a honeycomb structure 2 having porous partition walls 4 separating and forming a plurality of cells 5 communicating between an inlet end face A on an inlet side of a fluid and an outlet end face B on an outlet side of the fluid, and plugging portions 3 for plugging an opening portion of each of predetermined cells 5 on the inlet end face A and an opening portion of each of the other cells 5 on the outlet end face B.

In the case of using a plugged honeycomb structure 1 of such a structure as a filter such as a DPF, a basic purification mechanism is the same as that of the aforementioned conventional plugged honeycomb structure. That is, when gas $G_1$ to be treated is introduced into the cells 5 from the inlet end face A, particulate matter such as soot is trapped by the partition walls 4, and treated gas $G_2$ passing through the porous partition walls 4 and flowing into the adjacent cells 5 is discharged from the outlet end face B, thereby obtaining the treated gas $G_2$ where particulate matter in the gas $G_1$ to be treated is separated.

In a plugged honeycomb structure of the present invention, as its characteristic structure, 1.5% or more, preferably 2.5% or more, more preferably 5% or more of the plugging portions 3 plugging the opening portions of the predetermined cells 5 on the inlet end face A have a depressed pit 6 on the end face on the inlet end face A side.

Figure 2:
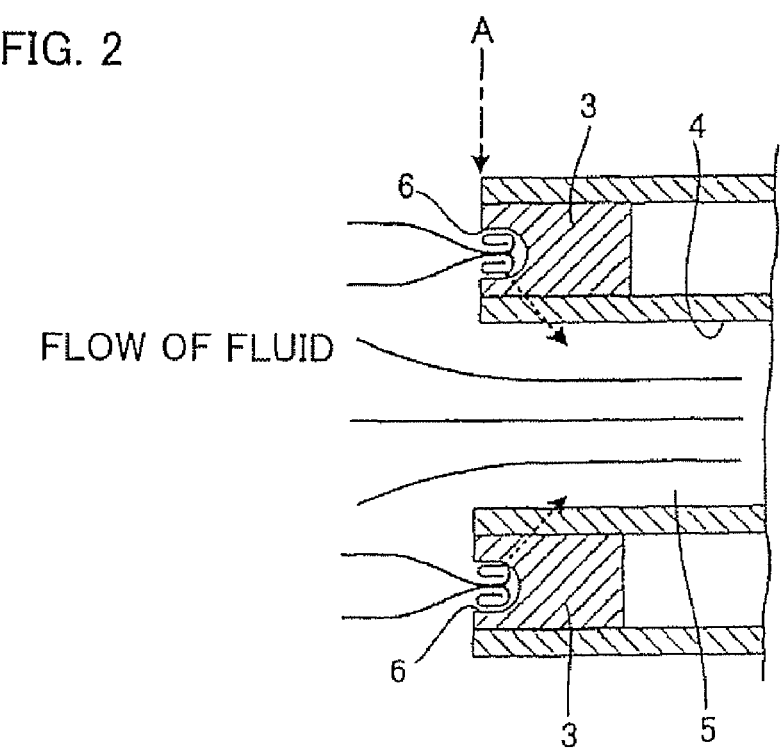
FIG. 2 is a partially enlarged view of a plugged honeycomb structure.

Thus, when a plugging portion 3 has a depressed pit 6, in the case that a plugged honeycomb structure 1 is disposed in a flow passage of a fluid such as exhaust gas, a flow stagnation caused by the strike of the fluid against the plugging portion 3 is generated inside the depressed pit 6 back from the inlet end face A as shown in FIG. 2, which reduces an influence on the flow of the fluid into the opening cells 5 between the plugged portions 3. This suppresses generation of a stagnation and a peel-away vortex of the fluid flowing into the opening cells 5 in the vicinity of the inlet end face A. As a result, the flow of the fluid becomes smooth to reduce pressure loss and to suppress clogging of the opening portions of the cells 5 by excess deposition of soot due to the stagnation of the flow in the vicinity of the inlet end face A. In addition, the fluid flowing into the depressed pit 6 passes through the pores in the thin portion of the plugging portion 3 formed by the presence of the depressed pit 6 and the pores of the partition walls 4 in contact with the plugging portion 3 and flows into adjacent cells 5, and the flow further facilitates a smooth flow of the whole fluid.

Incidentally, when the number of the plugging portions 3 each having a depressed pit 6 is below 5% of the number of the plugging portions 3 plugging the opening portions of the predetermined cells 5 in the inlet end face A, the aforementioned effect of the present invention cannot sufficiently be obtained. The upper limit of the number of the plugging portion is not particularly specified. However, in the case of using the structure in the following canning configuration, too high number may cause a problem in strength. Therefore, in such a case, the number is preferably about 70% or less.

Figure 3:
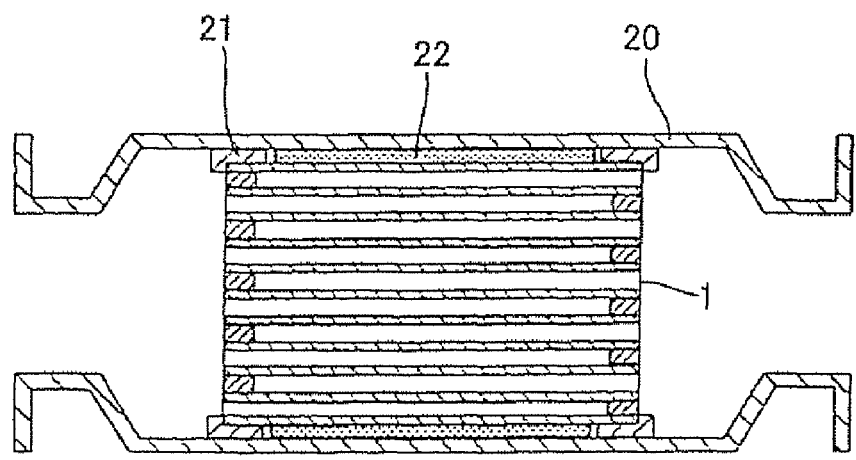
FIG. 3 is a cross-sectional view showing a canned state of a plugged honeycomb structure.

That is, when a plugged honeycomb structure 1 of the present invention 1 is used as a filter such as a DPF, as shown in FIG. 3, it is general to subject the honeycomb structure to compression-fixing (canning) in a cylindrical can body 20 in a state that a holding member 22 of a ceramic fiber mat or the like is wrapped around the outer peripheral wall of the plugged honeycomb structure 1 and that the vicinity of the end portion is clamped with a retainer ring 21. By this canning, a load by clamping with the retainer ring 21 is applied to plugging portions on the inlet end face side of the plugged honeycomb structure 1. Strength of the plugging portions reduces, and a possibility of damaging upon clamping with the retainer ring 21 increases as the number of the depressed pits in the plugging portions increases. Therefore, in the case of using a honeycomb structure in a canning configuration where the vicinity of the inlet side end portion is clamped with the retainer ring b 21, it is preferable that necessary clamp strength is secured by controlling the number of the plugging portions having a depressed pit as described above to be about 70% or less of the total number of the plugged portions arranged on the inlet end face side.

In the plugged honeycomb structure 1 of the present invention, each of the depressed pits 6 of the plugging portions 3 has a depth of preferably 1 to 4 mm, more preferably 1 to 2 mm, and further preferably 1 to 1.5 mm. When the depth of the depressed pits 6 is below 1 mm, the aforementioned effect of the present invention may be insufficient, and, when it is above 4 mm, there may cause a problem in strength.

That is, in the case of using a honeycomb structure in a canning method where the vicinity of the inlet side end portion is clamped with a retainer ring, as the depth of the depressed pits 6 of the plugging portions 3 increases, strength of the plugging portions reduces to increase a possibility of damaging upon clamping with the retainer ring. Therefore, in the case of using a structure in the aforementioned canning configuration, the depth of the depressed pits 6 is preferably about 4 mm or less to secure the necessary clamp strength.

In a plugged honeycomb structure 1 of the present invention, from the viewpoint of reducing pressure loss, it is preferable that a porosity of the plugging portions 3 is higher than that of the honeycomb structure (honeycomb structure main body excluding the plugging portions) 2. Specifically, the porosity of the plugging portions 3 is preferably 3% or more, more preferably 10% or more, higher than that of the honeycomb structure.

However, in the case of using a structure by a canning method where the vicinity of the inlet side end portion is clamped with a retainer ring, as the porosity of the plugging portions 3 increases, strength of the plugging portions 3 reduces to increase a possibility of damaging upon clamping with a retainer ring. Therefore, in the case of using a structure in the aforementioned configuration, the porosity of the plugging portions 3 is preferably about 80% or less to secure necessary clamp strength. Incidentally, "porosity" described here is a value calculated by the Archimedes method.

In addition, a plugged honeycomb structure 1 of the present invention may have a structure where an opening ratio is different between the inlet end face and the outlet end face. Since, in a plugged honeycomb structure used for a DPF or the like, all the cells have the same shape (generally quadrangular shape) having the same opening area, which is alternately plugged in such a manner that the inlet end face and the outlet end face show checkerwise patterns, it is general that the inlet end face and the outlet end face have an equivalent opening ratio. However, there has recently been proposed a plugged honeycomb structure where the opening ratio of the inlet end face is larger than that of the outlet end face for the purpose of suppressing rise in pressure loss after trapping soot, or the like.

Figure 4:
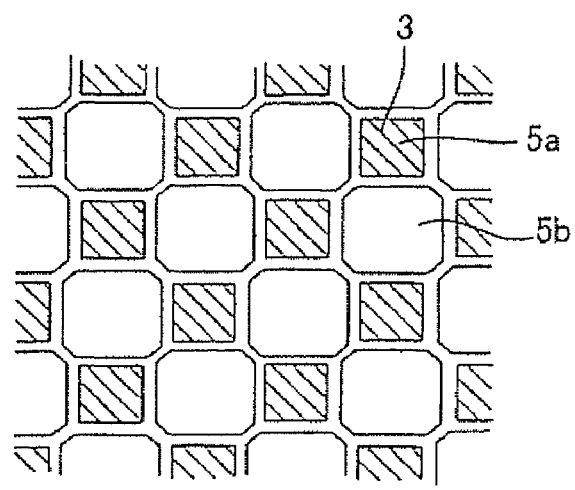
FIG. 4 is a partially enlarged view of the inlet end face showing an example of an embodiment of a plugged honeycomb structure having different opening ratios between the inlet end face and the outlet end face.
Figure 5:
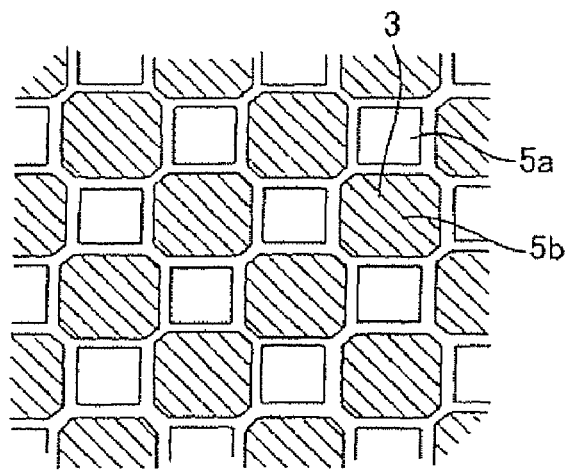
FIG. 5 is a partially enlarged view of the outlet end face showing an example of an embodiment of a plugged honeycomb structure having different opening ratios between the inlet end face and the outlet end face.

FIGS. 4 and 5 show an example of an embodiment of a plugged honeycomb structure having different opening ratios between the inlet end face and the outlet end face. FIG. 4 is a partially enlarged view of the inlet end face, and FIG. 5 is a partially enlarged view of the outlet end face. As shown in these figures, in this embodiment, quadrangular cells 5a and octagonal cells 5b having a larger opening area than the quadrangular cells 5a are alternately disposed in perpendicular two directions on each end face. The quadrangular cells 5a are plugged by the plugging portions 3 on the inlet end face, and the octagonal cells 5b are plugged by the plugging portions 3 on the outlet end face. By thus allowing the octagonal cells 5b having a larger opening area to open on the inlet end face and the quadrangular cells 5a having a smaller opening area to open on the outlet end face, the opening ratio of the inlet end face can be made higher than that of the outlet end face.

Though a plugged honeycomb structure of the present invention may be a unitarily formed plugged honeycomb structure, it may be constituted by unitarily bonding a plurality of honeycomb segments. That is, a plugged honeycomb structure may be constituted by unitarily combining and bonding, in a direction perpendicular to an axial direction of the cells, a plurality of honeycomb segments comprising: porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face.

In the case of continuously using a plugged honeycomb structure as a DPF in a long period of time, it is necessary to periodically perform a regeneration treatment for combusting and removing deposited particulate in order to put the filter performance back into the initial state by reducing the pressure loss increased by the particulate matter deposited with the passage of time inside the filter. Upon the regeneration treatment, large thermal stress generates in the plugged honeycomb structure, and the thermal stress may cause a defect such as a crack and breakage. In order to improve thermal shock resistance against the thermal stress, there has recently been proposed a plugged honeycomb structure having a divided structure having a function of dispersing and reducing the thermal stress by unitarily joining a plurality of honeycomb segments by means of a bonding material layer. Also, in a plugged honeycomb structure of the present invention, such a structure can be employed.

In addition, in a plugged honeycomb structure of the present invention, plugging portions may have a depressed pit in both the end faces of the plugged honeycomb structure. In this case, since the effect of the present invention can be obtained by employing any of the end faces on the inlet side end face, it is not necessary to consider direction of the end face when the plugged honeycomb structure is arranged in the flow passage of the fluid.

Examples of the material constituting the honeycomb structure (or honeycomb segment) used for a plugged honeycomb structure of the present invention include, from the viewpoint of the strength and thermal resistance, at least one kind selected from the group consisting of silicon carbide (SiC), silicon-silicon carbide based composite material formed by using silicon carbide (SiC) as the framework and silicon (Si) as the bonding material, silicon nitride, cordierite, mullite, alumina, spinel, silicon carbide-cordierite based composite material, lithium aluminum silicate, aluminum titanate, and Fe—Cr—Al based metal. Of these, a material constituted by silicon carbide (SiC) or a silicon-silicon carbide based composite material is preferable. In addition, it is preferable that the constituent material for the plugging portion is the same material as the material for the honeycomb structure in order to reduce the thermal expansion difference from the honeycomb structure.

As a method for manufacturing a honeycomb structure (or honeycomb segment) before plugging used in the present invention, a known method can be employed As a specific example of the method, to a material described above are added a binder such as methyl cellulose, hydroxypropoxyl cellulose, hydroxyethyl cellulose, carboxymethyl cellulose, and polyvinylalcohol; a pore former; a surfactant; water as a solvent; and the like to prepare kneaded clay having plasticity, the kneaded clay is subjected to extrusion-forming into a predetermined honeycomb shape, and the kneaded clay is dried by microwaves, hot air, or the like and then fired. The firing may be performed before forming the plugging portions in the cells or together with firing of the plugging portions after forming the plugging portions in the cells As a method for plugging the cells, a known method can be employed. As a specific example of the method, after a sheet is applied on an end face of a honeycomb structure, holes are made in positions corresponding with the cells to be plugged of the sheet, the end face of the honeycomb structure is immersed in plugging slurry obtained by slurrying a constituent material for the plugging portions in a state having a sheet attached on the face to fill the plugging slurry in the opening end portions of the cells to be plugged through the holes of the sheet, and the slurry is dried and/or fired for hardening.

Though a method for forming the depressed pits is not particularly limited, the depressed pits can be formed by, for example, after forming plugging portions each having a flat end face by a plugging method as described above, depressed pit is made on the end face by the use of a drill or the like.

In a plugged honeycomb structure of the present invention, the partition walls of the honeycomb structure have a thickness of preferably 7 to 20 mil (178 to 508 µm) more preferably 8 to 16 mil (203 to 406 µm), further preferably 10 to 12 mil (254 to 305 µm). When the thickness of the partition walls is below 7 mil, strength is insufficient, and thermal shock resistance may decrease. On the other hand, when the thickness of the partition walls is above 20 mil, pressure loss tends to increase.

The honeycomb structure has a cell density of preferably 140 to 350 cells/in$^2$ (cpsi), more preferably 160 to 320 cpsi, furthermore preferably 200 to 300 cpsi. When the cell density is below 140 cpsi, a contact efficiency with the fluid tends to be insufficient. On the other hand, when the cell density is above 350 cpsi, the pressure loss tends to increase. Incidentally, "cpsi" stands for "cells per square inch", which is a unit showing the number of cells per square inch. For example, 10 cpsi is about 1.55 cells/cm$^2$.

EXAMPLE

Hereinbelow, the present invention will be described in more detail on the basis of Examples. However, the present invention is by no means limited to these Examples.

There was prepared plugged honeycomb structures (the plugging portions were disposed in such a manner that the inlet end face and the outlet end face show complementary checkerwise patterns) each having a diameter of 143.8 mm, a length of 152.4 mm, a porosity, a cell structure, a depth of plugging portions, total number of plugging portions in the inlet end face, and a porosity of the plugging portions as shown in Tables 1 and 2 and having no depressed pit on the end face of each plugging portion. Depressed pits were made with a drill on the end face of the inlet end face side of the plugging portions plugging the opening portions of the cells in the inlet end face in each of the honeycomb structures so as to have the number of depressed pits and the depressed pit ratio (=number of plugging portions having a depressed pit/number of the whole plugging portions×100(%)) to obtain plugged honeycomb structures of sample Nos. 1 to 37. Each of the plugged honeycomb structure obtained above was measured for initial pressure loss, pressure loss after soot deposition, and clamp strength by the following methods, and the results are shown in Tables 3 and 4.

[Initial Pressure Loss]

Air not containing soot was allowed to flow into the plugged honeycomb structures at a flow rate of 10 m³/min. in a room having a temperature of 25° C. and pressure loss was measured in front and at the back of the plugged honeycomb structures to obtain the initial pressure loss.

[Pressure Loss After Soot Deposition]

Exhaust gas containing soot and having a temperature of 200° C. was allowed to flow into the plugged honeycomb structures at a flow rate of 2.3 Nm³/min. to gradually deposit the soot, and pressure loss was measured in front and at the back of the plugged honeycomb structures when soot deposition reached 4 g/L to obtain pressure loss after soot deposition.

[Clamp Strength]

Figure 6:
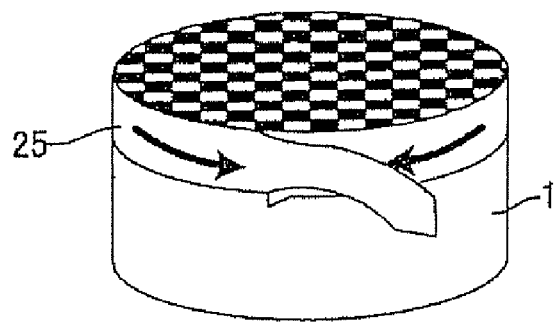
FIG. 6 is an explanatory view showing a method for measuring clamp strength.
Figure 7:
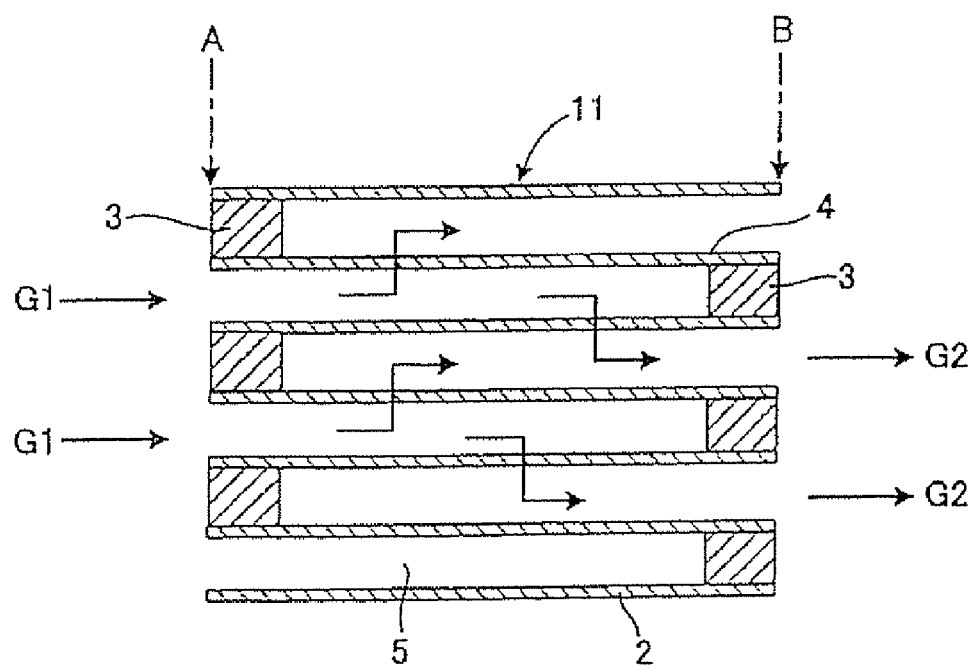
FIG. 7 is a cross-sectional view showing a constitution of a conventional plugged honeycomb structure.
Figure 8:
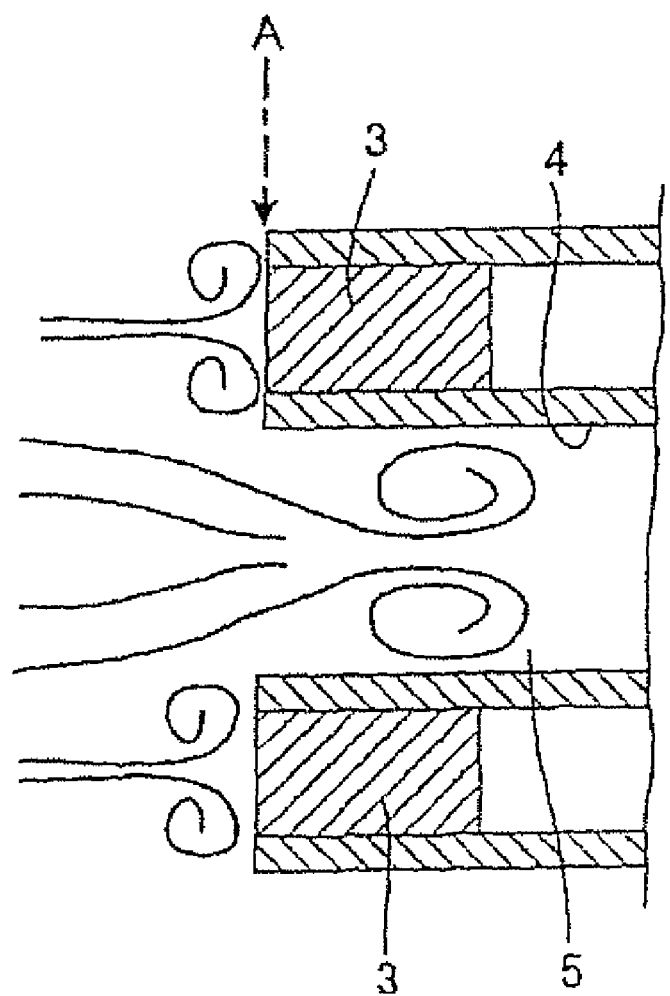
FIG. 8 is a partially enlarged cross-sectional view of a conventional plugged honeycomb structure.

As shown in FIG. 6, a band 25 having a width of 5 mm was wrapped in the vicinity of an end portion where plugging members were formed in each of the plugged honeycomb structures 1 for clamping, and the clamp strength was gradually increased to measure clamp strength by which the end face of the honeycomb structure 1 broke.

TABLE 1

| No. | Porosity of honeycomb structure [%] | Cell structure ||||  | Depth of plugging portion [mm] | Number of total plugging portions | Number of plugging portions having depressed pit | Depressed pit ratio [%] | Depth of depressed pit [mm] | Porosity of plugging portion [mm] |
|---|---|---|---|---|---|---|---|---|---|---|---|
|   |   | Partition wall thickness [mil] | Cell density [cpsi] | Opening ratio of inlet end face [%] | Opening ratio of outlet end face [%] |   |   |   |   |   |   |
| 1  | 50 | 12 | 300 | 31.4 | 31.4 | 6.0 | 3597 | 0    | 0.0   | 1.0 | 50 |
| 2  | 50 | 12 | 300 | 31.4 | 31.4 | 6.0 | 3597 | 30   | 0.8   | 1.0 | 50 |
| 3  | 50 | 12 | 300 | 31.4 | 31.4 | 6.0 | 3597 | 40   | 1.1   | 1.0 | 50 |
| 4  | 50 | 12 | 300 | 31.4 | 31.4 | 6.0 | 3597 | 70   | 1.9   | 1.0 | 50 |
| 5  | 50 | 12 | 300 | 31.4 | 31.4 | 6.0 | 3597 | 100  | 2.8   | 1.0 | 50 |
| 6  | 50 | 12 | 300 | 31.4 | 31.4 | 6.0 | 3597 | 150  | 4.2   | 1.0 | 50 |
| 7  | 50 | 12 | 300 | 31.4 | 31.4 | 6.0 | 3597 | 200  | 5.6   | 1.0 | 50 |
| 8  | 50 | 12 | 300 | 31.4 | 31.4 | 6.0 | 3597 | 300  | 8.3   | 1.0 | 50 |
| 9  | 50 | 12 | 300 | 31.4 | 31.4 | 6.0 | 3597 | 500  | 13.9  | 1.0 | 50 |
| 10 | 50 | 12 | 300 | 31.4 | 31.4 | 6.0 | 3597 | 750  | 20.9  | 1.0 | 50 |
| 11 | 50 | 12 | 300 | 31.4 | 31.4 | 6.0 | 3597 | 1000 | 27.8  | 1.0 | 50 |
| 12 | 50 | 12 | 300 | 31.4 | 31.4 | 6.0 | 3597 | 1500 | 41.7  | 1.0 | 50 |
| 13 | 50 | 12 | 300 | 31.4 | 31.4 | 6.0 | 3597 | 2000 | 55.6  | 1.0 | 50 |
| 14 | 50 | 12 | 300 | 31.4 | 31.4 | 6.0 | 3597 | 2500 | 69.5  | 1.0 | 50 |
| 15 | 50 | 12 | 300 | 31.4 | 31.4 | 6.0 | 3597 | 3000 | 83.4  | 1.0 | 50 |
| 16 | 50 | 12 | 300 | 31.4 | 31.4 | 6.0 | 3597 | 3597 | 100.0 | 1.0 | 50 |

TABLE 2

| No. | Porosity of honeycomb structure [%] | Cell structure |||| Depth of plugging portion [mm] | Number of total plugging portions | Number of plugging portions having depressed pit | Depressed pit ratio [%] | Depth of depressed pit [mm] | Porosity of plugging portion [mm] |
|---|---|---|---|---|---|---|---|---|---|---|---|
|   |   | Partition wall thickness [mil] | Cell density [cpsi] | Opening ratio of inlet end face [%] | Opening ratio of outlet end face [%] |   |   |   |   |   |   |
| 17 | 50 | 12 | 300 | 31.4 | 31.4 | 6.0 | 3597 | 100 | 2.8 | 0.5 | 50 |
| 18 | 50 | 12 | 300 | 31.4 | 31.4 | 6.0 | 3597 | 100 | 2.8 | 1.5 | 50 |
| 19 | 50 | 12 | 300 | 31.4 | 31.4 | 6.0 | 3597 | 100 | 2.8 | 2.0 | 50 |
| 20 | 50 | 12 | 300 | 31.4 | 31.4 | 6.0 | 3597 | 100 | 2.8 | 2.5 | 50 |
| 21 | 50 | 12 | 300 | 31.4 | 31.4 | 6.0 | 3597 | 100 | 2.8 | 3.0 | 50 |
| 22 | 50 | 12 | 300 | 31.4 | 31.4 | 6.0 | 3597 | 100 | 2.8 | 3.5 | 50 |
| 23 | 50 | 12 | 300 | 31.4 | 31.4 | 6.0 | 3597 | 100 | 2.8 | 4.0 | 50 |
| 24 | 50 | 12 | 300 | 31.4 | 31.4 | 6.0 | 3597 | 100 | 2.8 | 4.5 | 50 |
| 25 | 50 | 12 | 300 | 31.4 | 31.4 | 6.0 | 3597 | 100 | 2.8 | 5.0 | 50 |
| 26 | 50 | 12 | 300 | 31.4 | 31.4 | 6.0 | 3597 | 100 | 2.8 | 1.0 | 45 |
| 27 | 50 | 12 | 300 | 31.4 | 31.4 | 6.0 | 3597 | 100 | 2.8 | 1.0 | 55 |
| 28 | 50 | 12 | 300 | 31.4 | 31.4 | 6.0 | 3597 | 100 | 2.8 | 1.0 | 60 |
| 29 | 50 | 12 | 300 | 31.4 | 31.4 | 6.0 | 3597 | 100 | 2.8 | 1.0 | 65 |
| 30 | 50 | 12 | 300 | 31.4 | 31.4 | 6.0 | 3597 | 100 | 2.8 | 1.0 | 70 |
| 31 | 50 | 12 | 300 | 31.4 | 31.4 | 6.0 | 3597 | 100 | 2.8 | 1.0 | 80 |
| 32 | 50 | 12 | 300 | 31.4 | 31.4 | 6.0 | 3597 | 100 | 2.8 | 1.0 | 85 |

TABLE 2-continued

| | | Cell structure | | | | Number of | | | | |
| No. | Porosity of honeycomb structure [%] | Partition wall thickness [mil] | Cell density [cpsi] | Opening ratio of inlet end face [%] | Opening ratio of outlet end face [%] | Depth of plugging portion [mm] | Number of total plugging portions | plugging portions having depressed pit | Depressed pit ratio [%] | Depth of depressed pit [mm] | Porosity of depressed plugging portion [mm] |
|---|---|---|---|---|---|---|---|---|---|---|---|
| 33 | 50 | 12 | 300 | 38.4 | 25.2 | 6.0 | 3597 | 100 | 2.8 | 1.0 | 50 |
| 34 | 50 | 12 | 300 | 40.6 | 23.3 | 6.0 | 3597 | 100 | 2.8 | 1.0 | 50 |
| 35 | 50 | 12 | 300 | 40.6 | 23.3 | 6.0 | 3597 | 200 | 5.6 | 1.0 | 50 |
| 36 | 50 | 12 | 300 | 40.6 | 23.3 | 6.0 | 3597 | 300 | 8.3 | 1.0 | 50 |
| 37 | 50 | 12 | 300 | 44.7 | 19.8 | 6.0 | 3597 | 100 | 2.8 | 1.0 | 50 |

TABLE 3

| No. | Initial pressure loss [kPa] | Pressure loss after soot deposition [kPa] | Reduction ratio from standard* [%] | Clamp strength of plugging portion [kPa] |
|---|---|---|---|---|
| 1 | 4.1 | 8.4 | — | 13.5 |
| 2 | 4.1 | 8.4 | 0.0 | 13.5 |
| 3 | 4.1 | 8.4 | 0.0 | 13.5 |
| 4 | 4.1 | 8.3 | −1.2 | 13.5 |
| 5 | 4.1 | 8.2 | −2.4 | 13.5 |
| 6 | 4.1 | 8.2 | −2.4 | 13.2 |
| 7 | 4.1 | 8.1 | −3.6 | 13.1 |
| 8 | 4.0 | 8.1 | −3.6 | 12.8 |
| 9 | 4.0 | 8.0 | −4.8 | 12.9 |
| 10 | 4.0 | 7.8 | −7.1 | 12.5 |
| 11 | 4.0 | 7.8 | −7.1 | 12.3 |
| 12 | 4.0 | 7.5 | −10.7 | 11.9 |
| 13 | 3.9 | 7.2 | −14.3 | 11.3 |
| 14 | 3.9 | 6.9 | −17.9 | 10.8 |
| 15 | 3.9 | 6.7 | −20.2 | 10.5 |
| 16 | 3.9 | 6.5 | −22.6 | 10.5 |

*Regarding the pressure loss less than the standard which is the pressure loss after soot deposition of No. 1, the reduction ratio is shown with − in front thereof.

TABLE 4

| No. | Initial pressure loss [kPa] | Pressure loss after soot deposition [kPa] | Reduction ratio from standard* [%] | Clamp strength of plugging portion [kPa] |
|---|---|---|---|---|
| 17 | 4.1 | 8.4 | 2.4 | 13.5 |
| 18 | 4.1 | 8.2 | 0.0 | 13.5 |
| 19 | 4.1 | 8.1 | −1.2 | 13.3 |
| 20 | 4.1 | 7.9 | −3.7 | 13.2 |
| 21 | 4.1 | 7.7 | −6.1 | 12.5 |
| 22 | 4.1 | 7.5 | −8.5 | 12.0 |
| 23 | 4.1 | 7.3 | −11.0 | 11.5 |
| 24 | 4.1 | 7.1 | −13.4 | 9.9 |
| 25 | 4.1 | 6.8 | −17.1 | 9.8 |
| 26 | 4.1 | 8.3 | 1.2 | 13.5 |
| 27 | 4.1 | 8.2 | 0.0 | 13.2 |
| 28 | 4.1 | 8.2 | 0.0 | 12.7 |
| 29 | 4.1 | 8.1 | −1.2 | 12.3 |
| 30 | 4.0 | 8.1 | −1.2 | 11.8 |
| 31 | 4.0 | 8.0 | −2.4 | 11.3 |
| 32 | 4.0 | 7.9 | −3.7 | 9.6 |
| 33 | 4.9 | 7.8 | — | 12.8 |
| 34 | 5.3 | 7.6 | — | 11.6 |
| 35 | 5.3 | 7.5 | −1.3 | 11.6 |
| 36 | 5.3 | 7.4 | −2.6 | 11.6 |
| 37 | 6.5 | 7.2 | — | 10.9 |

*In Nos. 17 to 32, with the pressure loss after soot deposition of No. 5 being employed as the standard, regarding the pressure loss less than the standard, the reduction ratio is shown with − in front thereof. In Nos. 35 and 36, with the pressure loss after soot deposition of No. 34 being employed as the standard, regarding the pressure loss less than the standard, the reduction ratio is shown with − in front thereof.

From the results of Nos. 1 to 16, where the depressed pit ratio was changed within the range of 0.0 to 100%, it could be confirmed that the effect in reducing the pressure loss after soot deposition improves as the depressed pit ratio rises. In the case that all the plugging portions have a depressed pit (depressed pit ratio of 100%) the reduction effect of 22.6% was obtained in comparison with the case that no plugging portion has a depressed pit (depressed pit ratio of 0.0%). However, in the range of 1.1% or less of the depressed pit ratio, the reduction effect of the pressure loss after soot deposition was not shown. On the other hand, since the clamp strength tends to decrease as the depressed pit ratio rises, in the case of using a structure in a canning configuration where the vicinity of the end portion is clamped with a retainer ring, it is considered preferable to control the depressed pit ratio to about 70% or less.

From the results of Nos. 5 and 17 to 25, where the depressed pit depth was changed within the range from 0.5 to 5.0 mm, it could be confirmed that the effect in reducing the pressure loss after soot deposition improves as the depressed pit depth increases. In the case that the depressed pit depth was 5 mm, the reduction effect of 17.1% was obtained in comparison with the case of depressed pit depth of 1 mm. On the other hand, since the clamp strength tends to decrease as the depressed pit depth increase, in the case of using a structure in a canning configuration where the vicinity of the end portion is clamped with a retainer ring, it is considered preferable to control the depressed pit depth to about 4 mm or less.

From the results of Nos. 5 and 26 to 32, where the porosity of the plugging portions was changed within the range from 45 to 85%, it could be confirmed that the effect in reducing the pressure loss after soot deposition improves as the porosity rises. In the case that the porosity of the plugging portions was 85%, the reduction effect of 3-7% was obtained in comparison with the case that the porosity of the plugging portion was 50%. On the other hand, since the clamp strength tends to decrease as the porosity of the plugging portions rises, in the case of using a structure in a canning configuration where the vicinity of the end portion is clamped with a retainer ring, it is considered preferable to control the porosity of the plugging portion to about 80% or less.

In Nos. 33 to 37, as shown in FIGS. 4 and 5, there were used plugged honeycomb structures each having a structure where the opening ratio on the inlet end face is higher than that on the outlet end face by changing the opening area between the cells plugged on the inlet end face and the cells plugged on the outlet end face. It was found out that a plugged honeycomb structure having such a structure has a small influence of the depressed pit ratio in comparison with a plugged honeycomb structure having equivalent opening ratios between the inlet end face and the outlet end face. It is assumed to be because of a small peel-away vortex generated because such a structure where the opening ratio on the inlet end face is higher than that on the outlet end face has a smaller reduction ratio of the flow passage area on the inlet end face.

INDUSTRIAL APPLICABILITY

A plugged honeycomb structure of the present invention can suitably be used as a dust-collecting filter such as a DPF.

The invention claimed is:

1. A plugged honeycomb structure comprising:
 a honeycomb structure having porous partition walls separating and forming a plurality of cells communicating between an inlet end face on an inlet side of a fluid and an outlet end face on an outlet side of the fluid, and
 plugging portions for plugging an opening portion of each of predetermined cells on the inlet end face and an opening portion of each of the other cells on the outlet end face;
 wherein 1.5% to 70% of the plugging portions plugging the opening portions of the predetermined cells on the inlet end face have a depressed pit on the end face on the inlet end face side, and the depressed pit has a depth of 1 to 4 mm.

2. The plugged honeycomb structure according to claim 1, wherein 2.5% or more of the plugging portions plugging the opening portions of the predetermined cells on the inlet end face have a depressed pit on the end face on the inlet end face side.

3. The plugged honeycomb structure according to claim 1, wherein a porosity of the plugging portions is higher than that of the honeycomb structure.

4. The plugged honeycomb structure according to claim 2, wherein a porosity of the plugging portions is higher than that of the honeycomb structure.

5. The plugged honeycomb structure according to claim 3, wherein the plugging portions have a porosity of 80% or less.

6. The plugged honeycomb structure according to claim 4, wherein the plugging portions have a porosity of 80% or less.

7. The plugged honeycomb structure according to claim 1, wherein an opening ratio is different between the inlet end face and the outlet end face.

8. The plugged honeycomb structure according to claim 3, wherein an opening ratio is different between the inlet end face and the outlet end face.

9. The plugged honeycomb structure according to claim 1, wherein the plugged honeycomb structure is constituted by unitarily combining and bonding, in a direction perpendicular to an axial direction of the cells, a plurality of honeycomb segments comprising: porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face.

10. The plugged honeycomb structure according to claim 3, wherein the plugged honeycomb structure is constituted by unitarily combining and bonding, in a direction perpendicular to an axial direction of the cells, a plurality of honeycomb segments comprising: porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face.

11. The plugged honeycomb structure according to claim 7, wherein the plugged honeycomb structure is constituted by unitarily combining and bonding, in a direction perpendicular to an axial direction of the cells, a plurality of honeycomb segments comprising: porous partition walls separating and forming a plurality of cells communicating between an inlet end face on an inlet side of a fluid and an outlet end face on an outlet side of the fluid, and plugging portions for plugging an opening portion of each of predetermined cells on the inlet end face and an opening portion of each of the other cells on the outlet end face.

* * * * *